(12) United States Patent
Dvorak

(10) Patent No.: US 6,760,705 B2
(45) Date of Patent: Jul. 6, 2004

(54) VIRTUAL SPEECH INTERFACE SYSTEM AND METHOD OF USING SAME

(75) Inventor: Joseph L. Dvorak, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 614 days.

(21) Appl. No.: 09/871,392

(22) Filed: May 31, 2001

(65) Prior Publication Data

US 2002/0193998 A1 Dec. 19, 2002

(51) Int. Cl.[7] .......................... G10L 21/00; G10L 15/00
(52) U.S. Cl. .................................. 704/270.1; 704/270
(58) Field of Search .............................. 704/270, 270.1, 704/275

(56) References Cited

U.S. PATENT DOCUMENTS 5,819,220 A * 10/1998 Sarukkai et al. ......... 704/270.1
6,604,075 B1 * 8/2003 Brown et al. ............ 704/270.1

* cited by examiner

*Primary Examiner*—Susan McFadden

(57) ABSTRACT

A virtual speech interface system and method (100) for controlling a client device (103) using speech commands for electronic devices that do not include integrated speech control capability includes a virtual speech interface client program (113) installed within the client device for controlling a client device application (104). A virtual speech interface server device (101) that is separate from the client device (103 is then used to interface with the client program (113). The virtual speech interface server device (101 includes at least one server (111) for sending and/or receiving command information to the virtual speech interface client program (113) for controlling the client device (103) using speech commands.

15 Claims, 2 Drawing Sheets

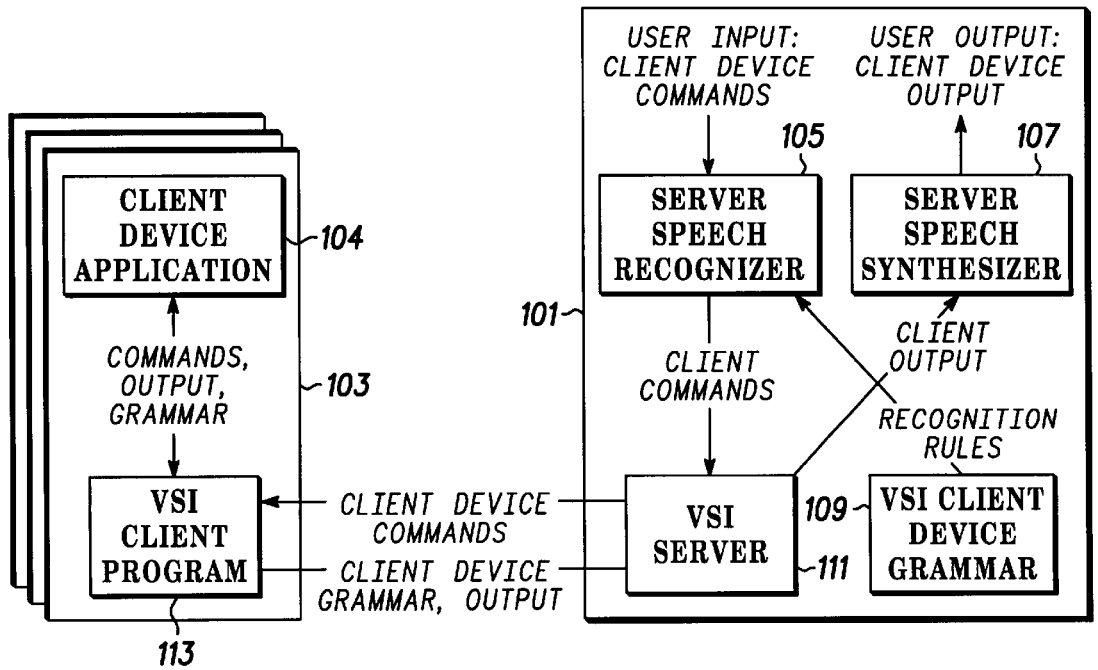
FIG. 1
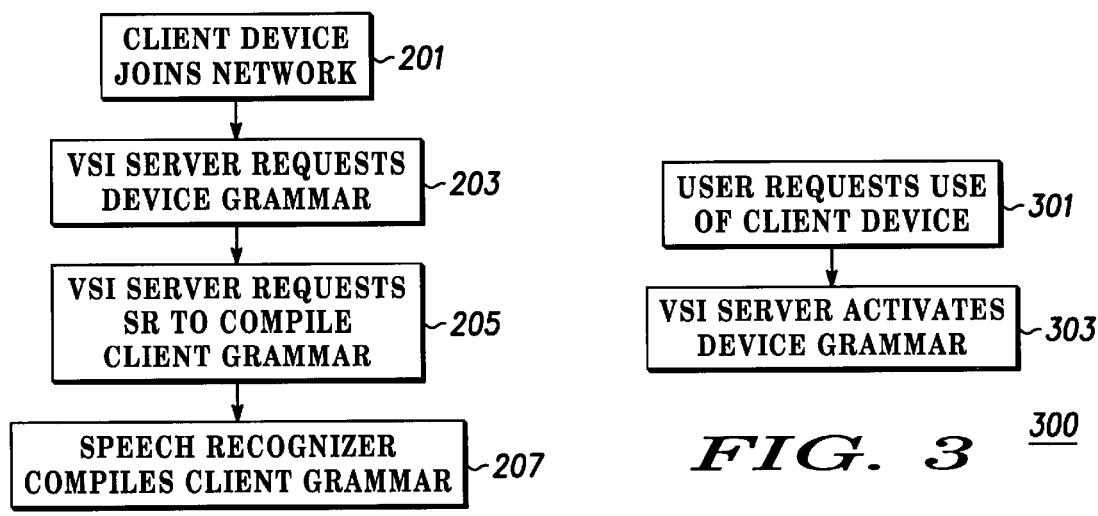
FIG. 2
FIG. 3

VIRTUAL SPEECH INTERFACE SYSTEM AND METHOD OF USING SAME

TECHNICAL FIELD

This invention relates in general to speech actuation and control and more specifically to virtual control of electronic devices using speech.

BACKGROUND

The development of dynamic, short range device-to-device communications technologies such as Bluetooth and HomeRF have made it attractive to construct personal communications systems that consist of a collection of specialized devices that collaborate to provide a custom suite of services to the user. For example, such a system could consist of a cell phone, personal digital assistant (PDA), digital camera, and/or print printer that permit a device to seamlessly connect with other electronic devices through a radio frequency (RF) link.

In such a system it would be useful if the devices could be controlled by speech where a user could speak one or more commands without the need to use touch screen or mechanical switches. This would enable the user to control a device in a hands free manner. An example might be adjusting various parameters of a digital camera while holding it to shoot a picture or speaking the email address of a recipient while using a two-way pager. While these devices could all eventually contain a Bluetooth transceiver or the functional equivalent, most of them will not be able to afford the overhead of a continuous speech recognizer and speech synthesizer. The software and hardware complement to accomplish such a task would require additional space for additional code not to mention the additional current drain that would be placed on the device due to the increased microprocessor requirements.

Thus the need exits for a mechanism to control devices by speech without requiring them to have integrated speech recognition and/or speech synthesis capabilities.

BRIEF DESCRIPTION OF THE DRAWINGS

FIG. 1 is a block diagram showing operation of the VSI client device with the VSI server device.

FIG. 2 is a block diagram showing the initialization of the client device and compilation of client grammar.

FIG. 3 is a block diagram showing the activation of the device grammar.

DETAILED DESCRIPTION OF THE PREFERRED EMBODIMENT

Figure 4:
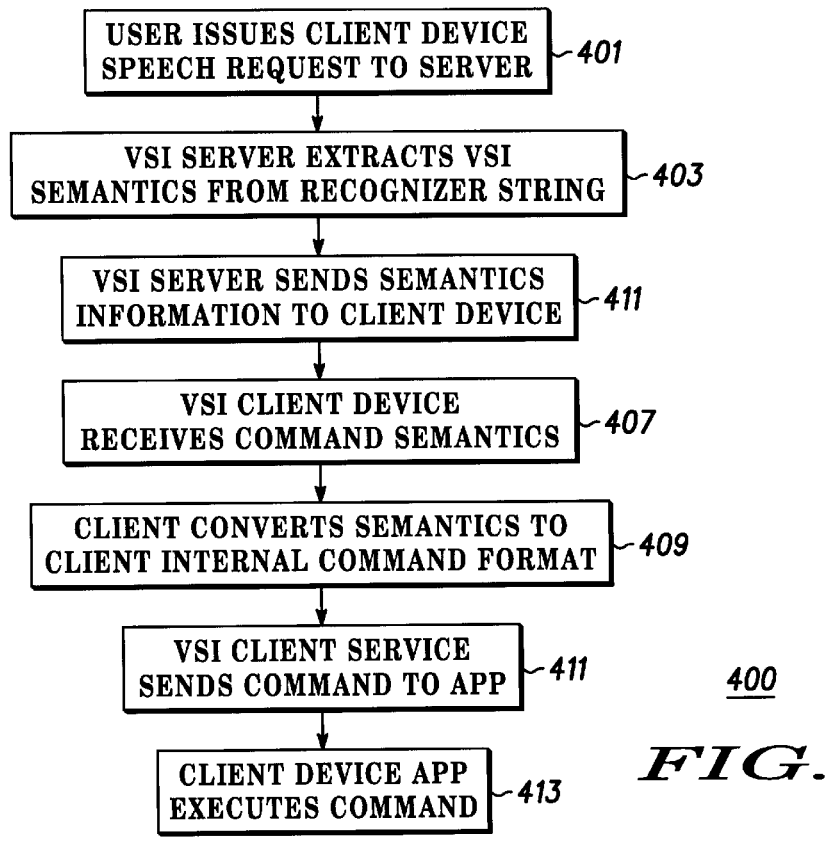
FIG. 4 is a block diagram showing recognition of the VSI client device by the VSI server device.

Referring now to FIG. 1, the virtual speech interface (VSI) mechanism operates in a system 100 that consists of a VSI Server device 101 and one or more client devices 103 that contain a VSI client program (104) (hereafter referred to as "client"). The server device 101 contains a VSI server program used with a VSI server 111 (hereinafter referred to as a "server") for facilitating the transfer of data from the server device 101 and the client 103. The server device 101 is the only device in the system 100 that must contain a speech recognizer 105 and a speech synthesizer 107. The speech recognizer 105 works with the VSI client device grammar 109 to interpret and process various client device commands input by a user while applying various recognition rules to insure these voice commands are recognized. The speech synthesizer 107 operates with the server 111 by taking output data from the client 103 through server 111 to annunciate voice data, instructions and/or information. As will be recognized by those skilled in the art, the client 103 has no speech input or output capability and can be any device that can communicate with the server 101 and is capable of containing the VSI client program 113.

FIG. 2 shows the steps upon which a client device 103 joins with a server 101. In this system, the client device becomes part of the system 201 while the VSI server is notified of the new VSI enabled device. The server requests 203 the client's VSI grammar and forwards 205 it to the speech recognizer. The speech recognizer compiles the client grammar 207 for use by the VSI server device.

As seen in FIG. 3, the steps of utilization of the client device with speech command capability 300 is shown. When the user indicates to the server that he wishes to use the client device 301, the VSI server instructs the speech recognizer to activate 303 the client's VSI grammar, which now resides on the server device. This enables the speech recognizer to recognize and interpret the client's VSI commands for use and control of the client device.

The client's VSI grammar contains a set of rules that specify the proper syntax of each client command. Each rule will also include the specific information that is to be sent to the client by the VSI server to execute the command. This information, that may also be referred to as "command semantics", is in a form that allows the recognizer to insert the information into a text string outputted by the recognizer and that can also be extracted by the VSI server.

An illustrative example client software code is shown below, along with the recognizer's output when the command is spoken. The format for the command semantics that can be used is to enclose the semantics in "[ ]" and to separate the semantic type from the value by a ":" within the brackets. The format of the directive to the speech recognizer to insert the command semantics into the recognizer output would be to enclose the information in "{ }". However, this is only one example and it will be evident to those skilled in the art that the VSI mechanism will operate with any set of conventions that uniquely identify the command semantics.

| | |
|---|---|
| User Input | display my calendar |
| Grammar Rule | <DisplayCalendar>:display my calendar { [App:calendar] } { [Cmd:display] } { [Time:today] }; |
| Recognizer Output | display my calendar [App:Calendar] [Cmd:display] [Time:Today] |
| Sent to Client | {App:calendar} [Cmd:display] [Time:today] |

In the example, the rule specifying the command to be recognized in "<DisplayCalendar>", the command phase is "display my calendar", and the command semantics are "[Cmd:display] [App:calendar] [Time:today]". The command semantics capture the essence of the command without he verbiage and is the only thing sent to the client by the VSI server. The format of the Command Semantics is independent of any specific VSI client device. This would allow any developer of personal digital assistants (PDAs), cell phones, etc. to develop VSI client programs more easily.

As seen in FIG. 4, the method of voice command execution 400 includes the user speaking 401 a client command i.e. the user issues the client device speech request to the server. The speech recognizer passes the recognized command as text along with the command semantics to the VSI server. The VSI server extracts 403 the command semantics and packages them for transfer 405 to the client device. When the client's VSI program receives 407 the semantic information for the command, it converts 409 the information into a device intrinsic internal command format. The command is then sent 411 to the appropriate application where the application executes 413 the command.

Figure 5:
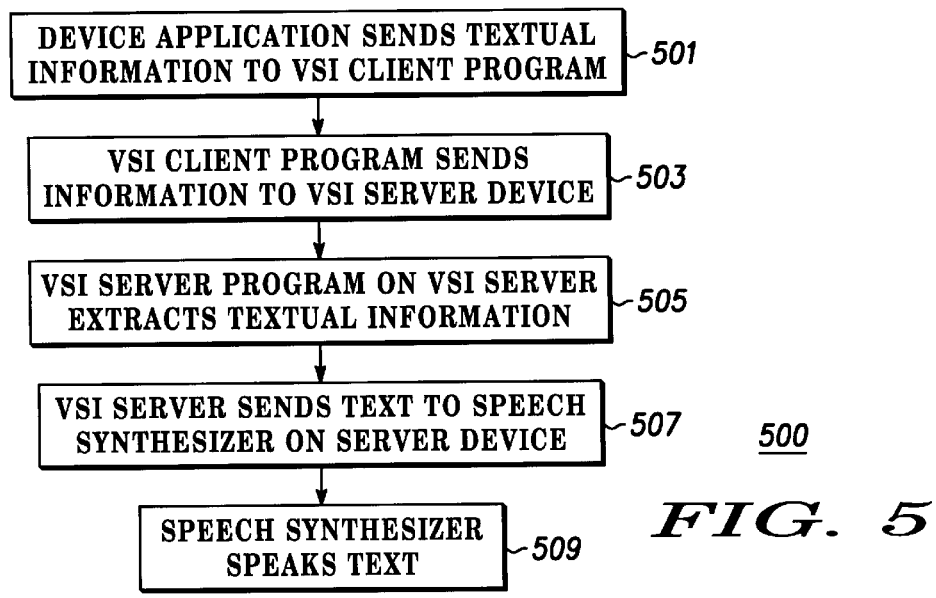
FIG. 5 is a block diagram showing synthesis of textual information from the VSI server.

As seen in FIG. 5, the method of conveying 500 textual information from the client to the server device. When the client application wishes to render 501 textual information to the user, the VSI can be used to render that information as speech. This allows the user to receive the information in a hands-free manner. The client application sends 503 the textual information to the device's VSI client program. The client program then packages the text and command semantics indicating that it is to be sent as output information and sends it to the VSI server device. When the VSI server device receives the transfer, it extracts 505 the information and passes it to its VSI server program. The server inspects the command semantics and since it is for output, sends 507 this information to the server's speech synthesizer. The speech synthesizer then speaks 509 the text for interpretation by the user. Below is an example of the information the client might send to the VSI server.

[App:VSI Server] {Cmd:output} [text:This is the text to be spoken]

The VSI mechanism is also used to transfer commands and information that affect the control of the VSI client-server operation between the non-speech capable device (the client), and the device containing the VSI server (the server). As in client command input and output, command semantics are used to provide this information and to distinguish it from client input and output. The illustrative example below shows command semantics for the server requesting a client's grammar.

| | |
|---|---|
| Server Requesting Client's Grammar | [App:VSI Client] [Cmd:GrammarRequest] |
| Client Responding with Grammar | [App:VSI Server] [Cmd:GrammarResponse] . . . Grammar . . . |

Thus, the virtual speech interface (VSI) of the present invention utilizes a client server architecture distributed around two devices i.e. the VSI server and the VSI client. It also utilizes a continuous speech recognizer and speech synthesizer. The combination of these elements provides a new capability to control devices by speech, even though these devices have no speech recognition or speech synthesis capabilities.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A virtual speech interface system for controlling a client device using speech commands that does not include integrated speech control capability comprising:
   a virtual speech interface client program installed within the client device for controlling a client device application;
   a virtual speech interface server device separate from the client device for interfacing with the client program; and
   wherein the virtual speech interface includes at least one server for sending command information to the virtual speech interface client program.

2. A virtual speech interface system as in claim 1, wherein the at least one server receives information from the virtual speech interface client program.

3. A virtual speech interface system as in claim 2, wherein the virtual speech interface server device includes a server speech synthesizer for receiving information output from the at least one server for annunciating information to the user from the client device.

4. A virtual speech interface system as in claim 1, wherein the virtual speech interface client program exchanges commands with the client device application.

5. A virtual speech interface system as in claim 1, wherein the virtual speech interface client program receives client device command information from the virtual speech interface server.

6. A virtual speech interface system as in claim 1, wherein the virtual speech interface server device includes a server speech recognizer for supplying client device speech commands to the at least one server.

7. A virtual speech interface system as in claim 6, wherein the virtual speech interface server device includes a client device grammar for providing recognition rules to the server speech recognizer.

8. A virtual speech interface system for controlling at least one client device not having an integrated voice control capability:
   a client device comprising:
   a client device application for controlling the device;
   a client program for interfacing with the client device application; and
   a server device comprising:
   a speech recognizer for recognizing client device speech commands;
   at least one server for transmitting control information from the speech recognizer to the client program.

9. A virtual speech interface system as in claim 8, wherein the at least one server receives control information from the speech recognizer.

10. A virtual speech interface system as in claim 9, wherein the server device further comprises:
    a speech synthesizer for receiving client output information from the at least one server for annunciating client device output information to a user.

11. A virtual speech interface system as in claim 8, wherein the server device further comprises:
    a client device grammar for providing speech recognition rules to the speech recognizer.

12. A method for controlling at least one client device that does not include integrated speech control capability using a virtual speech interface comprising the steps of:

receiving a client device command by a speech recognizer in a server device;

forwarding the client command to at least one server in the server device;

interfacing at least one server in a server device with a client program in the client device; and interfacing the client program with a device application to control the client device with speech commands.

13. A method for controlling at least one client device as in claim 12, wherein the step of interfacing comprises the steps of:

transmitting client device command information from the at least one server;

receiving client device grammar information from the client program to the at least one server.

14. A method for controlling at least on client device as in claim 13, further comprising the step of:

annunciating grammar information from the at least one server using a speech synthesizer.

15. A method for controlling at least one client device as in claim 12, further comprising the step of:

receiving at the speech recognizer recognition rules from a client device grammar for controlling the receipt of device commands at the speech recognizer.

\* \* \* \* \*